(12) United States Patent
Knebel et al.

(10) Patent No.: US 9,104,020 B2
(45) Date of Patent: Aug. 11, 2015

(54) METHOD AND SYSTEM FOR ILLUMINATING A SAMPLE

(71) Applicant: Leica Microsystems CMS GmbH, Wetzlar (DE)

(72) Inventors: Werner Knebel, Kronau (DE); Frank Sieckmann, Bochum (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 171 days.

(21) Appl. No.: 13/661,061

(22) Filed: Oct. 26, 2012

(65) Prior Publication Data

US 2013/0107358 A1     May 2, 2013

(30) Foreign Application Priority Data

Oct. 28, 2011 (DE) .......................... 10 2011 054 914

(51) Int. Cl.
    *G02B 21/06*      (2006.01)
    *G02B 21/00*      (2006.01)
    *G02B 21/08*      (2006.01)
    *G02B 21/10*      (2006.01)
    (Continued)

(52) U.S. Cl.
CPC ......... *G02B 21/0032* (2013.01); *G02B 21/0036* (2013.01); *G02B 21/0076* (2013.01); *G02B 21/084* (2013.01); *G02B 21/10* (2013.01); *G02B 21/16* (2013.01); *G02B 21/367* (2013.01)

(58) Field of Classification Search
CPC ...... G02B 21/16; G02B 21/06; G02B 21/367; G02B 21/0032; G02B 21/0076; G02B 21/002

USPC .......................................................... 359/385
See application file for complete search history.

(56) References Cited

U.S. PATENT DOCUMENTS

| | | | |
|---|---|---|---|
| 6,064,518 A | 5/2000 | Stelzer et al. | |
| 7,554,725 B2 | 6/2009 | Stelzer et al. | |
| 7,679,741 B2 * | 3/2010 | Dyba et al. .................... | 356/318 |

(Continued)

FOREIGN PATENT DOCUMENTS

| | | |
|---|---|---|
| DE | 19632040 A1 | 2/1998 |
| DE | 19834279 A1 | 3/2000 |

(Continued)

OTHER PUBLICATIONS

Swoger Jim et al., A confocal fiber-coupled single-lens theta microscope, Review of Scientific Instruments, AIP, Melville, NY, US, vol. 69, No. 8, Aug. 1, 1998, pp. 2956-2963.

(Continued)

*Primary Examiner* — Frank Font
(74) *Attorney, Agent, or Firm* — Leydig, Voit & Mayer, Ltd.

(57) ABSTRACT

A method for illuminating at least one sample in SPIM microscopy includes generating a light beam and forming a light strip from the light beam using an optical device that interacts with the light beam. The light strip is passed strip through at least one objective having optics configured to deliver detection light emanating from the sample directly or indirectly to a detector, with the objective optics interacting with the light strip. The light strip is deflected using a light-redirecting device downstream of the objective optics so as to propagate the light strip, after deflection, at an angle other than zero degrees with respect to an optical axis of the objective in order to illuminate the sample.

31 Claims, 6 Drawing Sheets

(51) Int. Cl.
  *G02B 21/16* (2006.01)
  *G02B 21/36* (2006.01)

(56) References Cited

U.S. PATENT DOCUMENTS

| | | | |
|---|---|---|---|
| 7,796,328 B2 | 9/2010 | Wolleschensky | |
| 2006/0012866 A1* | 1/2006 | Wolleschensky | 359/385 |
| 2007/0206278 A1* | 9/2007 | Dyba et al. | 359/385 |
| 2009/0225413 A1* | 9/2009 | Stelzer et al. | 359/385 |
| 2010/0265575 A1* | 10/2010 | Lippert et al. | 359/385 |
| 2011/0031414 A1 | 2/2011 | Lippert et al. | |
| 2011/0115895 A1* | 5/2011 | Huisken | 348/79 |
| 2012/0176674 A1 | 7/2012 | Lippert | |

FOREIGN PATENT DOCUMENTS

| | | |
|---|---|---|
| DE | 10257423 A | 6/2004 |
| DE | 102004034957 A1 | 2/2006 |
| DE | 102008018476 A1 | 10/2009 |
| DE | 10 2009 044986 A1 | 3/2011 |
| WO | WO 2010012980 A1 | 2/2010 |

OTHER PUBLICATIONS

Friechrich et al., STED-SPIM: Stimulated Emission Depletion Improves Sheet Illumination Microscopy Resolution, Biophysical Journal, Biophysical Society, US, vol. 100, No. 8, Dec. 29, 2010, pp. L43-L45.

Lindek et al; Journal of modern optics, Dec. 1999, vol. 46, No. 5, 843-858.

S. Hell, et al., Stimulated Emission Depletion Fluorescence Microscopy, Optics Letters. 19, No. 11, Dec. 1994, pp. 780-782.

* cited by examiner

METHOD AND SYSTEM FOR ILLUMINATING A SAMPLE

CROSS REFERENCE TO RELATED APPLICATIONS

This application claims priority to German Patent Application No. DE 10 2011 054 914.5, filed Oct. 28, 2011, which is hereby incorporated by reference herein in its entirety.

FIELD

The present invention relates to a method and a system for illuminating a sample in SPIM microscopy. The present invention also relates to a microscope, in particular a scanning microscope and/or a confocal scanning microscope, and to an experiment set-up for microscopic imaging of a sample using such a system and for carrying out such a method.

BACKGROUND

The aforementioned selective plane illumination microscopy (SPIM) technique underlying the present invention is described, for example, in Lindek et al; Journal of modern optics, 1999, vol. 46, no. 5, 843-858.

A microscope which operates according to the SPIM method is described in DE 102 57 423 A1. In this microscope, a sample is illuminated by a thin light strip, while the viewing takes place perpendicularly to the plane of the illuminating light strip. Here, illumination and detection are carried out via two separate optical trains having separate optics, in particular, two separate objectives oriented perpendicular to each other. The light strip is produced by the illumination objective and an upstream cylindrical optical element. For image acquisition, the sample is moved through the light strip, which is stationary relative to the detector, to capture fluorescent and/or scattered light layer by layer using an area detector. The tomographic image data so obtained can then be assembled into one data set representative of a three-dimensional image of the sample. In order to produce as thin a light strip as possible, the illumination objective must have a correspondingly high numerical aperture. Moreover, the free working distance of the illumination objective must be large enough to prevent collision with the observation objective. The perpendicular arrangement of the two objectives can be disadvantageous in the imaging of certain samples, especially biological ones. For example, it is often not possible to place spherical objects in a collision-free manner under a right-angled arrangement of objectives. In addition to the extreme requirements imposed on the sample preparation, frequently unwanted shading occurs in the sample.

In a modified SPIM technique described in WO 2010/012980 A1, illumination and detection are performed using the same objective. To this end, the entrance pupil of the objective is under-illuminated at an off-center position; i.e., the illumination beam passes through a portion of the entrance pupil that is transversely offset from the optical axis. A cylindrical lens upstream of the objective produces a light sheet in the sample, which light sheet is inclined to the optical axis of the objective. The sample region illuminated by this light sheet is then imaged by the objective onto a detector. However, this device is designed exclusively for oblique illumination of the sample by means of a light sheet and does not allow for a different use, and especially not for point-by-point confocal scanning of the sample or variation of the spatial light intensity distribution of the light sheet, and in particular, not for illumination by a light strip oriented perpendicular to the optical axis of the objective.

German Patent Publication DE 10 2004 034 957 A1 describes an arrangement for microscopic observation through a microscope objective, where light guides for the light illuminating the sample are provided in the objective housing outside the lens optics. The illuminating light initially propagates parallel to the optical axis of the objective within the light guide, and then strikes reflectors of small aperture, which are mounted on the objective housing and which, with the aid of additional imaging elements, focus the illuminating light into the sample in a direction perpendicular to the optical axis of the microscope objective, and thus perpendicular to the viewing direction. Here, too, planar illumination of the sample is provided according to the SPIM principle. Although the use of a microscope objective configured in this manner does indeed eliminate the need to use an additional objective for the illuminating light, the special design of this special objective with additional light guides and reflectors is technically very complex and expensive.

SUMMARY

In an embodiment, the present invention provides a method for illuminating at least one sample in SPIM microscopy includes generating a light beam and forming a light strip from the light beam using an optical device that interacts with the light beam. The light strip is passed strip through at least one objective having optics configured to deliver detection light emanating from the sample directly or indirectly to a detector, with the objective optics interacting with the light strip. The light strip is deflected using a light-redirecting device downstream of the objective optics so as to propagate the light strip, after deflection, at an angle other than zero degrees with respect to an optical axis of the objective in order to illuminate the sample.

BRIEF DESCRIPTION OF THE DRAWINGS

Exemplary embodiments of the present invention are described in more detail below with reference to the drawings, in which the described and/or illustrated features can be each be provided alone or in any useful combination, in the drawings.

DETAILED DESCRIPTION

An aspect of the present invention is to provide improved methods and systems for illuminating a sample in SPIM microscopy in order to enable planar sample illumination, in particular orthogonal to the viewing direction, which is quickly adjustable and also reliable and versatile to use, while preferably allowing the use of many of the components that are present anyway in a microscope, in particular in a scanning microscope.

Accordingly, the present invention provides a method for illuminating a sample in SPIM microscopy, including the following steps:

a. generating a light beam, b. forming a light strip from the light beam by means of an optical means that interacts with the light beam, c. passing the light strip through at least one objective having optics designed and intended to deliver detection light emanating from the sample directly or indirectly to a detector, the objective optics interacting with the light strip; and d. deflecting the light strip by means of a light-redirecting device downstream of the objective optics in such a way that in order to illuminate the sample, the light strip, after deflection, propagates at an angle other than zero degrees, in particular at a right angle, with respect to the optical axis of the objective and is preferably focused in the sample.

Furthermore, the present invention provides a system including a. a light source for generating a light beam, b. means for forming a light strip from the light beam, in particular, for substantially planar illumination of a sample in a plane of illumination from at least one direction, c. at least one objective having optics designed and intended to deliver detection light emanating from the sample directly or indirectly to a detector, the objective optics interacting with the light strip, and d. a light-redirecting device disposed downstream of the objective optics to deflect the light strip such that, after deflection, it propagates at an angle other than zero degrees, in particular at a right angle, with respect to the optical axis of the objective and/or is located in a plane not parallel to the optical axis of the objective.

In accordance with the present invention, it was discovered that sample illumination according to the SPIM method, in particular planar illumination in a plane perpendicular to the viewing direction, can be achieved using essentially a conventional microscope objective without additional optics inside the microscope housing, the illuminating light passing through the objective optics and being subsequently focusable by a light-redirecting device into the sample at an angle other than zero degrees, in particular at a right angle, with respect to the optical axis of the objective.

In accordance with the present invention, the light beam illuminating the sample is generated using light sources customary and well-known in microscopy, such as, for example, CW lasers or pulsed lasers.

In an advantageous embodiment of the present invention, the optical means for forming the light strip according to the inventive method and system may have a beam deflector capable of moving the light beam in a plane of illumination, and preferably at such a speed that, de facto, there is a light strip present in the illumination plane and/or that the detectors provided for detecting the light emanating from the sample and the downstream analyzers of a microscope cannot distinguish this illumination from a continuous light strip and/or that the acquired image data does not or not substantially differ from the data that would be obtained in the case of illumination by a continuous light strip.

The pivoting motion of the light beam generated by the beam deflector may be used, in particular, to move the focus within the sample, and thus, to produce a focused light strip for planar illumination of the sample from a particular direction. This can be achieved, for example, by the beam deflector tilting the light beam back and forth upstream of the objective at a sufficient speed, so that the resulting oscillation of the focused light beam, averaged over time, leads to a plate-like or planar light distribution in an illumination plane within the sample.

The beam deflector preferably deflects the light beam in such a way that it remains approximately stationary at a tilt point in the region of the entrance pupil of the objective, while at a distance from the entrance pupil in the direction of the beam deflector, the light beam performs a pivoting motion relative to a reference direction parallel to the optical axis. This pivoting motion of the light beam is converted by the objective and the downstream light-redirecting device to a corresponding motion of the focus of the light beam, which focus is produced, inter alia, by the objective. For microscopy, the sample is preferably placed in this focus. The actual size of the focus and the amplitude of the movement of the focus in the sample depend on the specific design of the objective optics and, possibly, on additional optical elements that may be used in the optical path.

In a particularly suitable and a technically easy-to-implement embodiment, the beam deflector may have at least one rotating mirror and/or a tilting mirror, preferably a galvanometer mirror, and/or a rotating prism and/or a movable lens and/or an acousto-optical deflector. The beam deflector may, in particular, be the beam deflector of a scanning microscope or a confocal scanning microscope, as may be available.

In another embodiment of the present invention, a cylindrical optical element may be provided in addition to, or in place of, the beam deflector as an optical means for forming the light strip.

In another advantageous embodiment of the present invention, the shape and/or the position and/or the orientation of the light strip are adjusted or adjustable by the aforedescribed optical means and/or the objective and/or the light-redirecting device.

The position and/or the orientation of the light strip can be adjusted by adjusting a pivoting motion by means of a beam deflector. The shape, in particular, the width, of the light strip can be adjusted, for example, by selecting different oscillation amplitudes for the pivoting motion.

In a particular embodiment, the optical paths of the light beam and/or of the light strip and/or of the detection light are matched to one another in such a way that the light strip has a focus at a location in the sample to be observed, and that detection light emanating from that location in the sample has a detection focus on the detector.

The detector is preferably located in a plane that corresponds to the detection plane. The position and orientation of the detection plane depend substantially on the type, orientation and position of the object, the position of the detector and of additional optical components that may be present between the detector and the objective. The light strip is preferably positioned and oriented such that, after deflection, it is located in the detection plane.

When both the illumination and the detection are through the objective, it should be noted that the light path of the light strip from the pupil of the objective to its focus is generally longer than the light path of the detection light, which, emanating from the sample region illuminated by the focus of the light strip, passes directly through the objective and reaches the pupil of the objective directly. This is especially due to the deflection. This difference in path length can be compensated for, for example, when the light beam reaches the objective not as a parallel light beam, but as a divergent light beam. Divergence can be achieved by means of additional optics that act only on the light beam, but not on the detection light. Alternatively, the difference in path length may of course also be compensated for by correspondingly lengthening the detection beam path. A combination of both measures is of course also possible.

In accordance with a separate inventive idea which is independent of the idea of a light strip, provision may be made for the sample not to be illuminated in a strip-like manner, but in a line-like manner, in particular when the light beam does not perform any pivoting motion. In this case, the beam deflector can also be used to illuminate the sample sequentially by the focused light beam, as it were, in the manner of a scanning method. However, other than in conventional scanning microscopes or confocal scanning microscopes, the light beam can have an angle other than zero degrees with respect to the optical axis of the objective.

In addition, the shape of the light strip can advantageously be varied by under-illuminating the entrance pupil of the objective with the light beam. To this end, the light beam does not pass through the entire area of the entrance pupil, and thus, does not use the full aperture of objective. This under-illumination causes the focus of the light beam to be widened in both the longitudinal and transverse directions.

Moreover, the beam deflector may be used, for example, to direct the light beam to different, in particular, off-center, locations on the entrance pupil. In this way, it is achieved that the orientation of the focused light beam, respectively of the light strip downstream of the objective, and thus also the orientation of the light beam, respectively of the light strip in the sample, change in accordance with an advantageous embodiment of the present invention.

In embodiments of the present invention, the objective optics interact with the light beam, respectively with the light strip, whereby the objective optics further being designed and intended to deliver detection light emanating from the sample directly or indirectly to a detector, such as a CCD camera (charge-coupled device).

According to another advantageous embodiment of the invention, an additional objective and/or condenser optics may alternatively be used for delivering the detection light emanating from the sample directly or indirectly to the detector. To this end, the additional objective and/or the condenser optics may be disposed opposite to the objective along the optical axis thereof, with the sample being located therebetween.

In accordance with the present invention, a light-redirecting device is provided downstream of the objective optics to deflect the light strip in such a way that in order to illuminate the sample, the light strip, after deflection, propagates at an angle other than zero degrees, in particular at a right angle, with respect to the optical axis of the objective and is preferably focused in the sample.

In another advantageous embodiment of the invention, the light-redirecting device is fixedly secured or securable to the objective and/or to the additional objective and/or to the condenser optics. In particular, the light-redirecting device may be retained to the aforementioned components in such a way that it is movable against the force of a resilient member, in particular a spring, at an angle other than 90 degrees with respect to the optical axis of the objective.

The connection used for securing the light-redirecting device may be a threaded connection, which is technically particularly easy to implement. To this end, the head of the objective; i.e., the end of the objective facing the sample, may have an external thread formed concentrically with the optical axis of the objective and engageable with a corresponding internal thread on the light-redirecting device.

Along these lines, a further advantageous embodiment is envisaged in which, again, the light-redirecting device is provided with releasable, preferably manually releasable, connecting means, such that the light-redirecting device may be fixedly secured as a retrofit part to the objective and/or to another conventional objective. This also allows for replacement of light-redirecting devices of different design.

Alternatively, at least one component of the light-redirecting device may be made integrally with a component of the objective or a component of the additional objective or a component of the condenser optics.

In an advantageous embodiment of the present invention, the light-redirecting device for deflecting the light strip has a least one at least partially reflective surface. To this end, the reflective surface may be formed as part of, for example, a planar mirror.

Furthermore, in order to prevent the occurrence of shading in the sample, it may be advantageous to illuminate the sample with the light strip from at least two directions by means of the light-redirecting device and/or the optical means for forming the light strip, it being preferred for the light strip to be focused from each of the at least two directions in a single focal region in the sample. This can be accomplished, for example, in that the light-redirecting device has two opposed mirrors, and in that the beam deflector tilts the light strip symmetrically about the objective axis alternately at two different angles, in particular at a frequency on the order of, for example, 1 kHz, so that the sample is illuminated via the two mirrors from two opposite sides. In the process, the oscillation frequency for forming the light strip is significantly higher than the frequency at which the direction of movement is changed.

In another embodiment of the present invention, the sample may be radially illuminated or illuminable with the light strip from all directions of a plane. Here, too, the light strip is focused from each of the directions of the plane in a single focal region in the sample. To this end, the light-redirecting device may be configured such that the reflective surface is at least partially formed on the inner side of a cone. In addition, the light strip is guided by the beam deflector along a circular path about the optical axis of the objective, so that, averaged over time, radial illumination of the sample from all sides is obtained.

The SPIM method described at the outset advantageously allows three-dimensional imaging of a spatially extended sample. This imaging method is based on layer-by-layer sample detection, followed by reconstruction of the three-dimensional shape from the two-dimensional tomographic images. For purposes of capturing the individual images, it is especially advantageous if the sample is moved or movable relative to the objective and to the light-redirecting device, especially along the optical axis of the objective. In addition, provision may also be made when the sample is rotated or rotatable relative to the objective and to the light-redirecting device, especially about the optical axis of the objective. Rotation of the sample also makes it possible to achieve illumination from multiple directions.

Furthermore, provision may be made for the sample to be placed or placeable in an optical medium, in particular an immersion medium. This may serve to increase the optical resolution, to observe live cells or tissue surrounded by aqueous solutions and/or to suppress contrast-reducing reflections by avoiding refractive index changes. Examples of possible immersion media include water, silicone oil or glycerin.

In particular when using such optical media, it may be advantageous if the sample is placed or placeable in a sample chamber. Alternatively, a capillary may be provided for the positioning of the sample.

In order to prevent the sample and/or the devices that hold the sample from colliding with the light-redirecting device and/or the objective, the sample may advantageously be placed or placeable on a pedestal. The use of a pedestal allows the sample to be positioned particularly close to the objective optics in order to increase the optical resolution, especially when the light-redirecting device is configured to laterally surround the sample as described earlier herein.

When optical media, in particular, immersion media, are used, another embodiment of the present invention may provide that the objective is designed as an immersion objective and, in addition, that the objective and/or the light-redirecting device is/are immersed in the sample chamber and/or in the optical medium.

A further embodiment of the invention may provide that a plurality of samples are arranged in the form of a matrix, and that these are successively or repeatedly cyclically subjected to microscopic examinations using the illumination system of the present invention and/or using the method of the present invention. To this end, the samples may, for example, be placed on a slide, for example, embedded in agar or water, and successively scanned. In this regard, provision may be made to lower the sample support when the position relative to the objective and/or to the light-redirecting device is to be changed. Upon movement to the new position, the sample is returned close to the objective and the light-redirecting device.

In a particularly advantageous embodiment of the present invention, the light strip may be superimposed or superimposable with a stimulation light beam and/or a stimulation light strip to increase the optical resolution according to the principle of STED microscopy. The principle of stimulated emission depletion (STED) microscopy is described, for example, in S. Hell, et al., Stimulated Emission Depletion Fluorescence Microscopy, Optics Letters. 19, No. 11, 1994, pp. 780-782 and is generally used to increase the spatial resolution of a light-microscopic image beyond the diffraction limit. In the process, fluorescent dyes, which are used to label individual regions of the sample, are selectively depleted, and thus, as it were, turned off by the stimulation light beam or the stimulation light strip, so that they will not emit any fluorescent light during detection. Accordingly, the stimulation light beam could also be referred to as "turn-off light beam" and the stimulation light strip could also be referred to as "turn-off light strip".

In the method and system for illuminating the sample, the STED method can be employed such that the sample region from which fluorescent light is emitted is smaller than the sample region that is illuminated with the light strip. In an advantageous embodiment, the effect achieved is that the resulting light strip is formed thinner or flatter.

Another way of increasing the resolution is by using the RESOLFT technology. This technology uses special dyes which, by exposure to suitable light, can be selectively converted to a state in which they can no longer emit detection light. Through selective exposure to suitable light of the portion of the sample region that is illuminated by the light strip, it is possible to reduce the region that emits detection light, and thus to increase the resolution.

To this end, it is particularly preferred to superimpose the light strip and the stimulation light beam, respectively the stimulation light strip, in such a way that they are both focused in a common region in the sample. When the STED method is used conventionally, the focus of the stimulation light beam is annular in cross section, similar, as it were, to a TEM01* Laguerre-Gauss mode. In contrast, the here described embodiment of the present invention advantageously provides that the focus of the stimulation light beam have a shape which, in cross section, has two intensity maxima located symmetrically above and below the plane of illumination created by the light strip and a minimum located in the focus of the light strip between said maxima. This minimum is similar, as it were, to a TEM01 Hermite-Gauss mode. Such a light mode can be generated, for example, using a phase plate. In this way, it is achieved that the emission volume from which detection light can be emitted is reduced only in the direction of its transverse extent of the focus perpendicular to the illumination plane, but not in the direction of the longitudinal extent of the focus. Overall, this results in a very thin emission volume of large surface area, which makes it possible to acquire cross-sectional images of the sample with high spatial resolution.

The principles of the different pupil illumination options will initially be described with reference to FIGS. 1a-1c, 2a-2c and 3a-3c. It should be noted here that these figures are purely schematic and are merely intended to facilitate the understanding of the present invention. In the following explanation, reference is made to a coordinate system whose x-axis is oriented horizontally in the plane of the paper and whose z-axis is oriented vertically in the plane of the paper, while the y-axis points out of the plane of the paper.

Figure 1A:
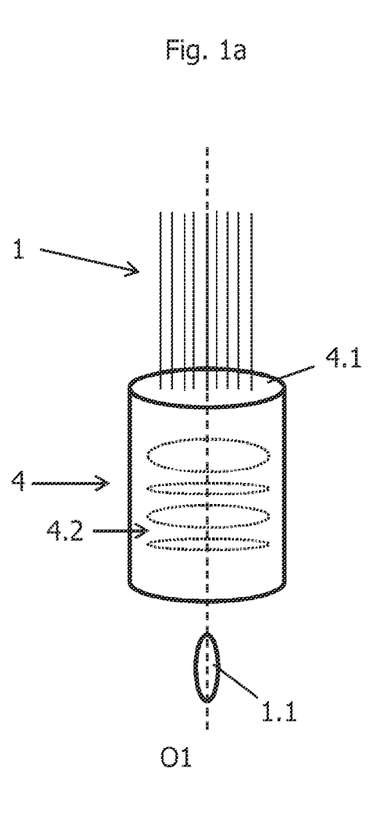
FIG. 1a is a schematic view wherein the entrance pupil of an objective for producing a focus is fully illuminated.

FIG. 1a shows the case where the entrance pupil 4.1 of an objective 4 is fully illuminated by a light beam 1. Light beam 1 propagates parallel to optical axis O1 of objective 4 (z-axis) and enters entrance pupil 4.1 (x-y plane) of objective 4 perpendicularly. Objective 4 produces a focused light distribution in the form of a focus of the light beam 1.1, which has a greater extent along optical axis O1 than transverse to optical axis O1.

Figure 1B:
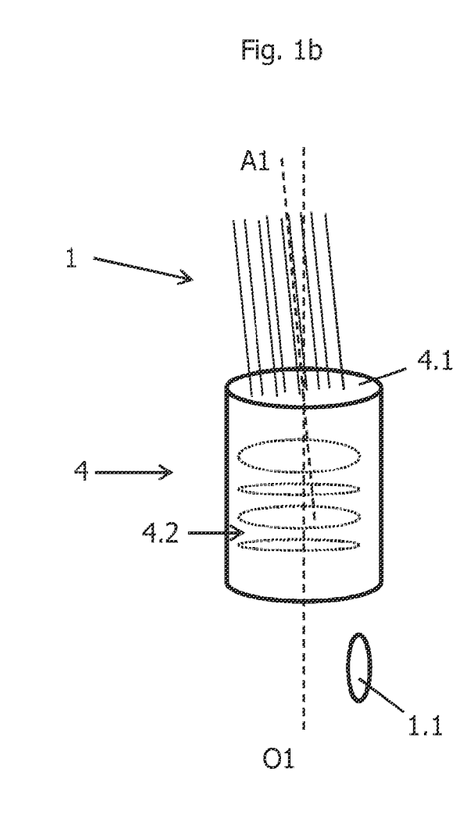
FIGS. 1b and 1c are schematic views illustrating the effect obtained when a light beam entering the entrance pupil of the objective is tilted.
Figure 1C:
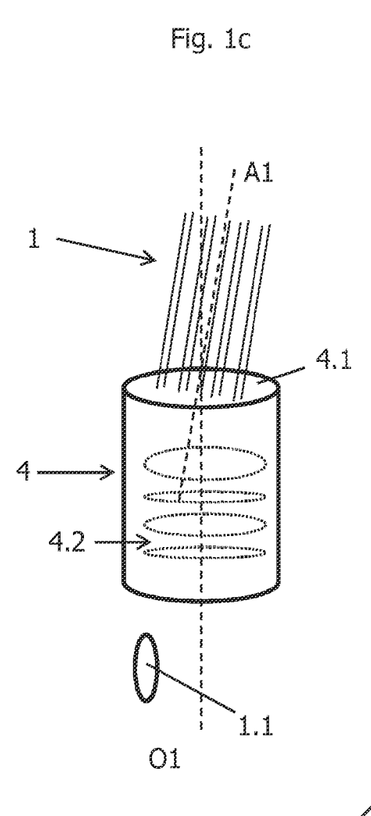

FIGS. 1b and 1c illustrate how the position of focus 1.1 changes when light beam 1 is tilted in entrance pupil 4.1 of objective 4 relative to optical axis O1, but still fully illuminates entrance pupil 4.1. The change in the direction of incidence A1 of light beam 1 caused by the tilt is translated by optics 4.2 of objective 4 into a movement of focus 1.1 transverse to optical axis O1. Since light beam 1 passes through the entire entrance pupil 4.1 of objective 4, focus 1.1 remains oriented such that its longitudinal extent is parallel to optical axis O1.

Figure 2A:
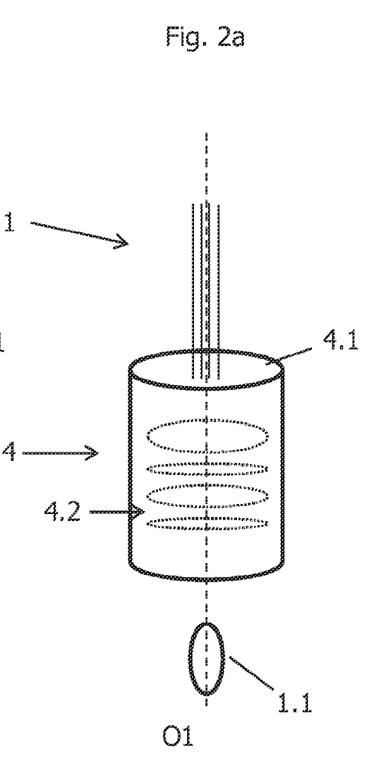
FIG. 2a is a schematic view wherein the entrance pupil of an objective for producing a focus is under-illuminated.

FIG. 2a illustrates an under-illumination of entrance pupil 4.1 of objective 4. As can be seen, light beam 1 passes through only a portion of entrance pupil 4.1 of objective 4. The under-illumination of entrance pupil 4.1 causes a widening of focus 1.1; i.e., focus 1.1 is overall larger than when illuminating the full entrance pupil 4.1.

Figure 2B:
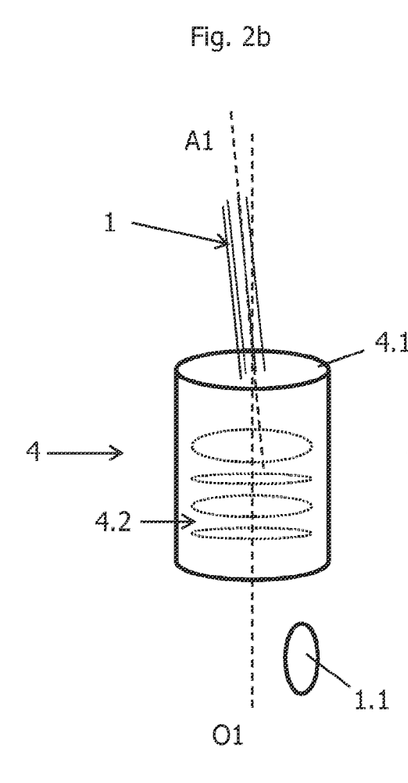
FIGS. 2b and 2c are schematic views illustrating the effect obtained when a light beam that under-illuminates the entrance pupil of the objective is tilted.
Figure 2C:
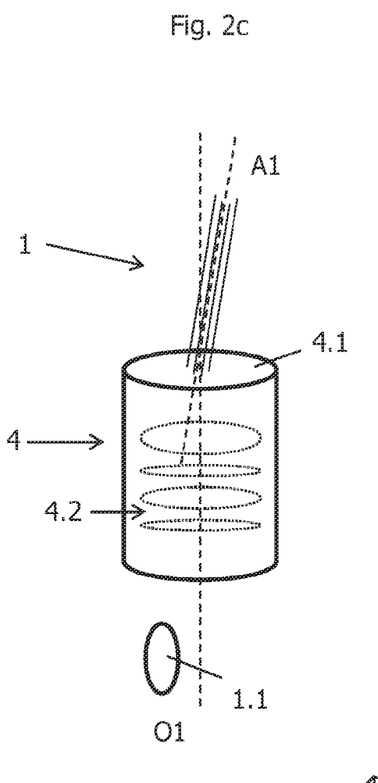

FIGS. 2b and 2c show the case where the light beam 1 that under-illuminates entrance pupil 4.1 passes centrally through entrance pupil 4.1 and is tilted in entrance pupil 4.1. Considering the explanations given with reference to the preceding figures, the overall results is that widened focus 1.1 is shifted outwardly. In this connection, the distance from optical axis O1 is all the greater, the more light beam 1 is tilted relative to optical axis O1.

Figure 3A:
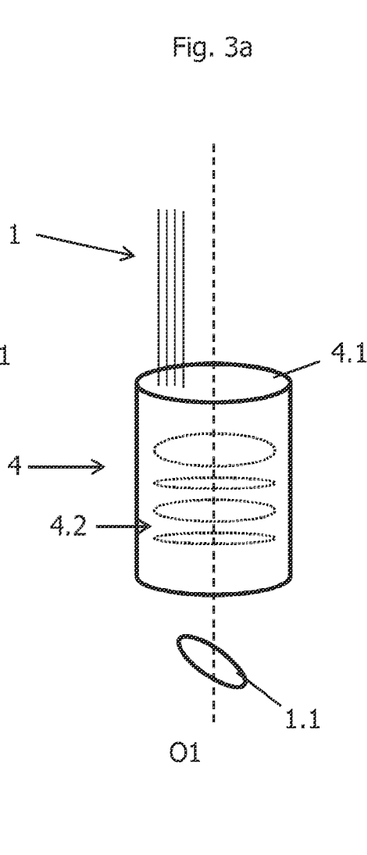
FIG. 3a is a schematic view illustrating the off-center under-illumination of the entrance pupil of an objective for producing a focus.
Figure 3B:
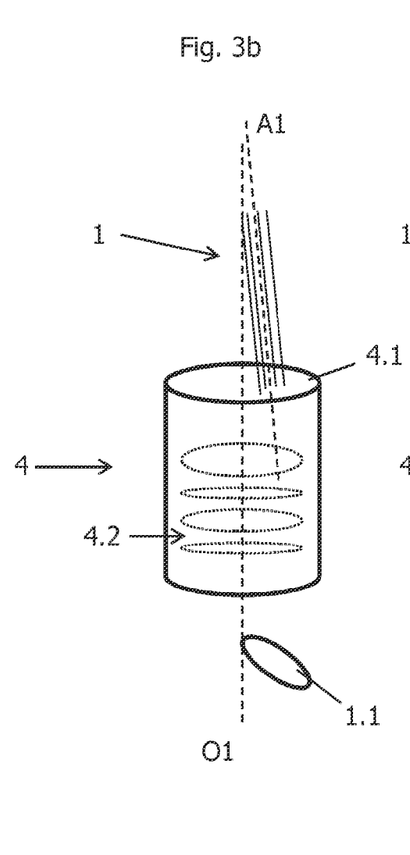
FIGS. 3b and 3c are schematic views illustrating the effect obtained when a light beam that under-illuminates the entrance pupil of the objective at an off-center position is tilted.
Figure 3C:
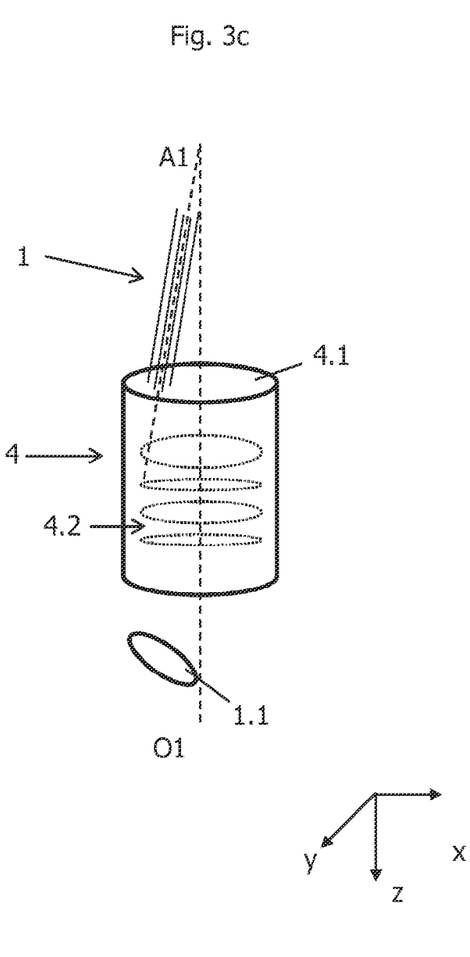

In FIGS. 3a-3c, the light beam 1 that under-illuminates entrance pupil 4.1 of objective 4 is, in addition, is disposed off-center; i.e., transversely offset from the optical axis O1. This off-center position of light beam 1 in entrance pupil 4.1 results in focus 1.1 being inclined relative to optical axis O1. This may be useful, for example, to direct light strip 2 into the sample at different angles with respect to optical axis O1.

Figure 4:
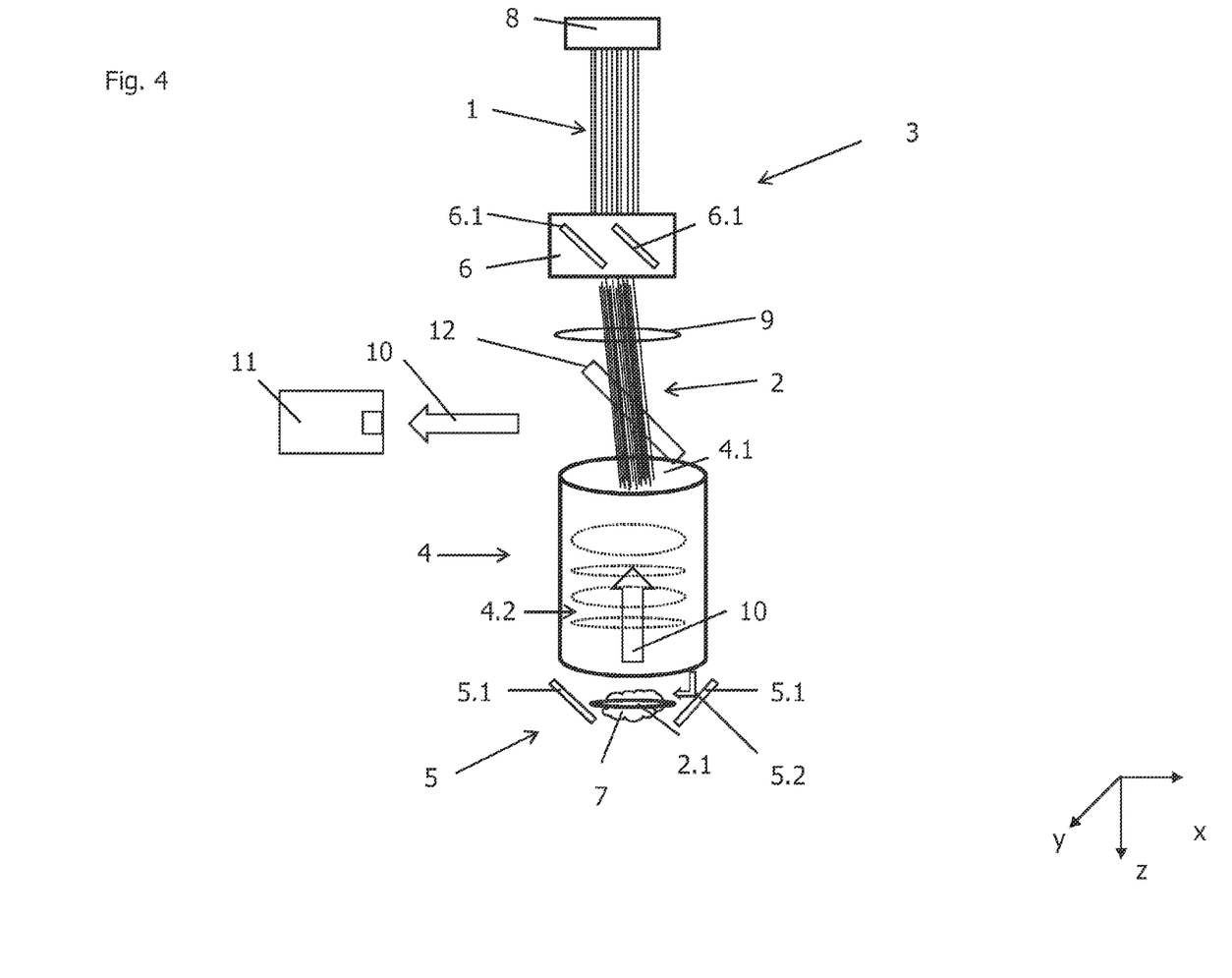
FIG. 4 is a schematic view of a possible embodiment of the system of the present invention for carrying out the method of the present invention for illuminating a sample in SPIM microscopy.

FIG. 4 shows, in schematic form, a possible embodiment of the system of the present invention for carrying out the method of the present invention for illuminating a sample in SPIM microscopy. To this end, the system has a light source 8 for generating light beam 1. In the exemplary embodiment shown here, the light source is a solid-state laser emitting a CW laser beam having a wavelength of, for example, 532 nm.

The system further has a beam deflector 6 which forms light strip 2 from light beam 1 in the manner described at the outset and which, in addition, causes light beam 1, respectively the light strip 2 formed, to be tilted in entrance pupil 4.1 of objective 4 relative to optical axis O1. In the present exemplary embodiment, this is accomplished using two tilting mirrors 6.1 as essential parts of beam deflector 6. Each of these tilting mirrors 6.1 is tiltable through a maximum angular range of 20 degrees. The tilting motion along both spatial directions is produced by electromagnetic actuators, one each for each of said directions. In the present exemplary embodiment, among other things, the actuators enable tilting mirrors 6.1 to perform an oscillating tilting motion along both directions with a maximum bandwidth of 12 kHz. Overall, this makes it possible, firstly, to form a light strip 2, and secondly, to direct light strip 2 or light beam 1 into entrance pupil 4.1 of objective 4 at different angles and different positions.

Figure 5:
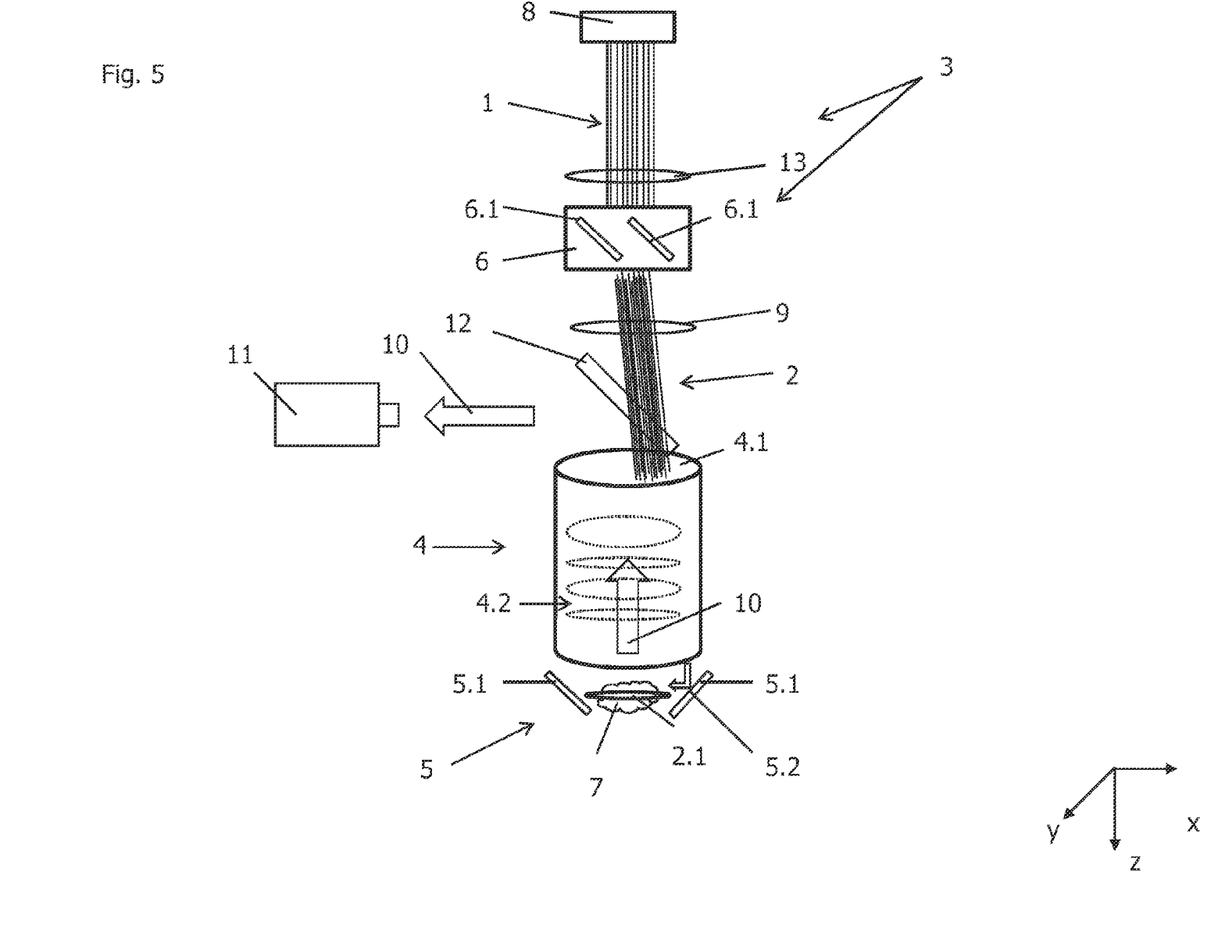
FIG. 5 is a schematic view of a further possible embodiment of the system of the present invention for carrying out the method of the present invention for illuminating a sample in SPIM microscopy; this embodiment having a cylindrical optical element in addition to the embodiment shown in FIG. 4.

As an alternative, or in addition, to beam deflector 6, the system may also have a cylindrical optical element 13 for forming light strip 2. FIG. 5 shows an embodiment of the present invention which has such a cylindrical optical element 13 arranged upstream of beam deflector 6. When a cylindrical optical element is used, it is also conceivable to omit the entire beam deflector, or at least parts thereof.

In the two embodiments shown in FIGS. 4 and 5, an additional lens optics 9 is disposed in the further optical path upstream of objective 4. Additional lens optics 9 forms, in conjunction with optics 4.2 of objective 4, the focus 2.1 of the light strip 2. The light strip is subsequently deflected by the light-redirecting device into sample 7. This deflection is performed such that in order to illuminate sample 7, light strip 2, after deflection, propagates at an angle other than zero degrees, in particular, as shown here, at a right angle, with respect to the optical axis of objective O1 and is focused in sample 7. It is essential to the invention here that light strip 2 interact with optics 4.2 of objective 4. Furthermore, optics 4.2 of objective 4 is also designed and intended to deliver detection light emanating from sample 7 directly or indirectly to a detector 11. To this end, in the present exemplary embodiment, a beam splitter 12 is provided in the optical path to direct detection light 10 emanating from sample 7 to a detector 11, such as a CCD camera, as shown here.

It can further be seen from FIGS. 4 and 5 that light-redirecting device 5 has two planar mirrors 5.1 for deflecting the light strip, as indicated here by right-angled arrow 5.2. The two mirrors are disposed symmetrically opposite each other with respect to optical axis O1 of objective 4 and are both reflective for the wavelength to be used. By using two opposed mirrors 5.1, sample 7 can be advantageously illuminated from two directions to avoid shading. To this end, as described at the outset, beam deflector 6 directs light strip 2 alternately via the two mirrors 5.1 into sample 7 for planar illumination thereof. Mirrors 5.1 are disposed such that light strip 2 is focused or focusable from both directions in a single focal region 2.1.

Figure 6:
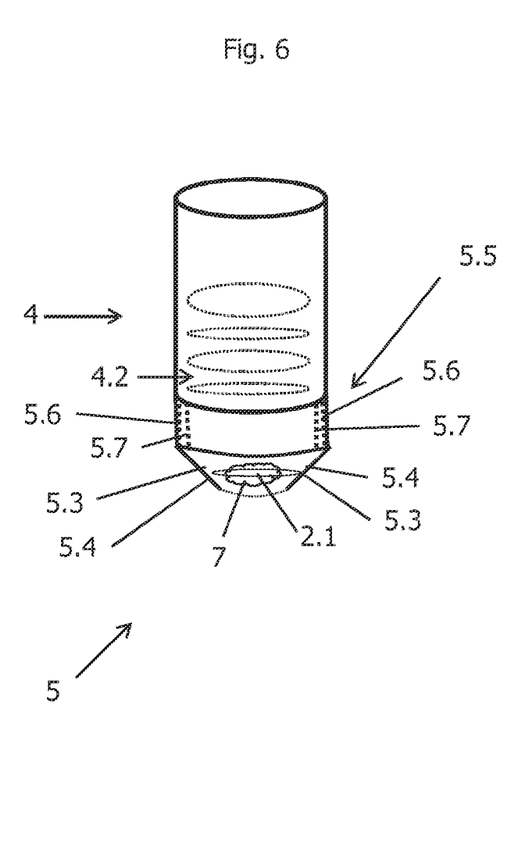
FIG. 6 is a schematic view showing a light-redirecting device and an objective according to a third embodiment of the system of the present invention for carrying out the method of the present invention.

Alternatively, the sample may be radially illuminated from all directions of a plane. To this end, in another embodiment of the present invention, light-redirecting device 5 has a reflective surface 5.3 provided on the inner side of cone 5.4, as is shown in FIG. 6. When beam deflector 6 guides light strip 2 in entrance pupil 4.1 of objective 4 along a circular path about optical axis O1, then planar illumination of the sample from all directions of a plane of illumination is obtained, averaged over time.

It is particularly advantageous, if light-redirecting device 5 can be fixedly secured to housing 4.3 of objective 4 by means of a manually releasable connection 5.5. To this end, in the embodiment of the invention shown in FIG. 6, conical light-redirecting device 5 is provided with an internal thread 5.6 which permits the light-redirecting device to be screwed onto objective 4 via a corresponding external thread 5.7 on housing 4.3 of objective 4. The particular advantage of this is that light-redirecting device 5 may be replaced by one of a different design. Alternatively, an objective 4 can in this way very easily be retrofitted with a light-redirecting device 5 which is suitably configured for the SPIM method.

Figure 7:
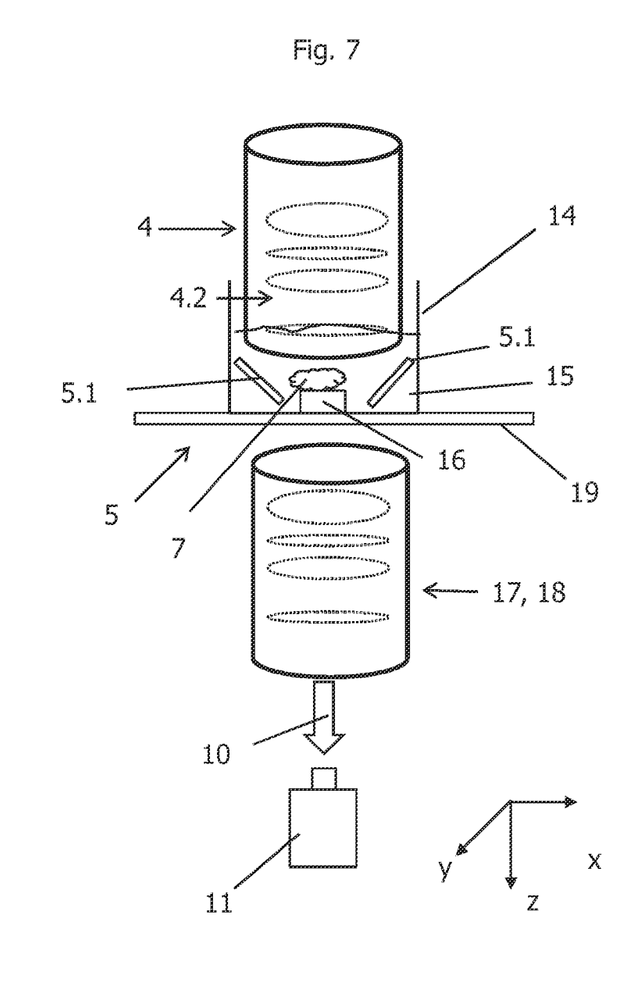
FIG. 7 is a schematic view of a fourth embodiment of the system of the present invention for carrying out the method of the present invention for illuminating a sample in SPIM microscopy; this embodiment preferably using an additional objective, among other things.

FIG. 7 shows a further embodiment of the present invention, where sample 7 is disposed in a sample chamber 14 filled with an optical medium 15 and where, in addition, sample 7 is placed on a pedestal 16, so that sample 7 can be brought close to high-resolution optics 4.2 of objective 4. In particular, this allows sample 7 to be positioned in a collision-free manner between the two mirrors 5.1 of the light-redirecting device 5 shown in FIG. 7. Both objective 4, here in the form of an immersion objective, and light-redirecting device 5 are immersed in optical medium 15, and thus also in sample chamber 14. In the present example, glycerin is used as the optical medium 15. However, water, silicone oil, or other immersion media, may also be used.

It can further be seen from FIG. 7 that, besides objective 4, an additional objective 17 or condenser optics 18 may be used for detection purposes; i.e., to deliver detection light 10 emanating from sample 7 directly or indirectly to a detector 11. In the exemplary embodiment shown here, an additional objective 17 is disposed below sample 7 opposite to objective 4 and oriented along the optical axis O1 thereof. Moreover, as shown in FIG. 7, a cover slip 19 may be disposed between sample 7 and additional objective 17, whose optics are corrected for observation through cover slip 19.

LIST OF REFERENCE NUMERALS 1 light beam
1.1 focus of the light beam
2 light strip
2.1 focus of the light strip 3 optical means (for forming a light strip)
4 objective
4.1 entrance pupil (of the objective)
4.2 optics (of the objective)
5 light-redirecting device
5.1 planar mirror
5.2 right-angled arrow (indicating the deflection of the light strip)
5.3 reflective surface
5.4 inner side of the cone
5.5 releasable connection
5.6 internal thread
5.7 external thread
6 beam deflector
6.1 tilting mirror
7 sample
8 light source
9 additional lens optics
10 detection light
11 detector
12 beam splitter
13 cylindrical optical element
14 sample chamber
15 optical medium
16 pedestal
17 additional objective
18 condenser optics
19 cover slip
O1 optical axis of the objective
A1 direction of incidence into the objective

What is claimed is:

1. A method for illuminating at least one sample in SPIM microscopy, the method comprising:
    generating a light beam;
    forming a light strip from the light beam using an optical device that interacts with the light beam;
    passing the light strip through at least one objective having optics configured to deliver detection light emanating from the sample directly or indirectly to a detector, the objective optics interacting with the light strip; and
    deflecting the light strip using a light-redirecting device downstream of the objective optics so as to propagate the light strip, after deflection, at an angle other than zero degrees with respect to an optical axis of the objective in order to illuminate the sample,
    wherein the objective optics interacts with the light strip upstream of the sample in an optical path of the light strip.

2. The method as recited in claim 1, wherein
    the optical device for forming the light strip has at least one beam deflector;
    the optical device for forming the light strip has at least one beam deflector in the form of a beam deflector of a scanning microscope or a confocal scanning microscope; or
    the beam deflector has at least one rotating mirror or a tilting mirror, a rotating prism, a movable lens, or an acousto-optical deflector.

3. The method as recited in claim 1, wherein the optical device for forming the light strip has at least one cylindrical optical element.

4. The method as recited in claim 1, wherein
    the shape, the position, or the orientation of the light strip is adjustable; or
    the shape, the position, or the orientation of the light strip is adjustable using the optical device for forming the light strip, the objective, or the light-redirecting device.

5. The method as recited in claim 1, wherein
    the objective is an immersion objective;
    the objective is an immersion objective and is immersed in a sample chamber or in a sample vessel filled with an optical medium surrounding the sample; or
    a sample to be illuminated is placed in a sample chamber or a sample vessel filled with an optical medium surrounding the sample and the light-redirecting device is immersed in the medium or is disposed in the medium.

6. The method as recited in claim 1, wherein
    the objective is used to illuminate the sample or to deliver the detection light emanating from the sample directly or indirectly to the detector; or
    an additional objective or condenser optics is/are used for delivering the detection light emanating from the sample directly or indirectly to the detector.

7. The method as recited in claim 1, wherein
    the light-redirecting device is fixedly secured to the objective, to the additional objective, or to the condenser optics;
    the light-redirecting device is retained to the objective, to the additional objective, or to the condenser optics in such a way that it is movable against the force of a resilient member, at an angle other than 90 degrees with respect to the optical axis of the objective; or
    the light-redirecting device is provided with at least one connection, such that the light-redirecting device is fixedly secured, fixedly securable as a retrofit part to the objective, to the other objective, or to the condenser.

8. The method as recited in claim 1, wherein at least one component of the light-redirecting device is made integrally with a component of the objective or a component of the additional objective or a component of the condenser optics.

9. The method as recited in claim 1, wherein
    the light-redirecting device for deflecting the light strip has a least one at least partially reflective surface; or
    the light-redirecting device for deflecting the light strip has a least one at least partially reflective surface, said reflective surface either being formed as part of a planar mirror or being at least partially formed on the inner side of a cone.

10. The method as recited in claim 1, wherein
    the sample is illuminated with the light strip from at least two directions, the light strip being focused from each of the at least two directions in a single focal region in the sample;
    the sample is radially illuminated with the light strip from all directions of a plane, the light strip being focused from each of the directions of the plane in a single focal region in the sample;
    the sample is illuminated from at least two directions by varying the direction of incidence, using the light-redirecting device or the optical device for forming the light strip; or
    the sample is radially illuminated with the light strip from all directions of a plane by rotating the direction of incidence, using the light-redirecting device or the optical device for forming the light strip.

11. The method as recited in claim 1, wherein for SPIM microscopy for imaging different layers of the sample during SPIM microscopy, the sample
    is moved or rotated relative to the objective and to the light-redirecting device;
    is placed in an optical medium;
    is placed in a sample chamber;
    is placed in a capillary;
    is placed on a pedestal; or is placed in a sample chamber filled with an optical medium surrounding the sample.

12. The method as recited in claim 1, wherein the optical paths of the light beam, of the light strip, or of the detection light are matched to one another in such a way that the light strip has a focus at a location in the sample to be observed, and that detection light emanating from that location in the sample has a detection focus on the detector.

13. The method as recited in claim 1, wherein to compensate for a difference in path length between a light path of the light beam and a light path of the detection light,
the light beam is directed to the objective as a divergent light beam;
the light beam is influenced by additional optics which act only on the light beam, but not on the detection light; or
the detection beam path is lengthened.

14. The method as recited in claim 1, wherein
the objective or the light-redirecting device is/are immersed in the sample chamber or in the optical medium; or
the objective or the light-redirecting device is/are disposed in the sample chamber or in the optical medium.

15. The method as recited in claim 1, wherein
the light strip is superimposed with at least one stimulation light beam or a stimulation light strip to increase the optical resolution according to the principle of stimulated emission depletion (STED) microscopy and in such a way that the sample region from which the light to be detected in order to generate an image is smaller than the sample region that is illuminated by the light strip; or
the light strip is superimposed with at least one stimulation light strip to increase the optical resolution according to the principle of stimulated emission depletion (STED) microscopy, the light strip and the stimulation light strip partially overlapping each other and being oriented parallel to one another.

16. A microscopy method, wherein
a sample is illuminated in accordance with a method according to claim 1; or
a plurality of samples are arranged together in the form of a matrix, on a microscope stage or on a slide and are microscopically examined one after the other, each sample being illuminated in accordance with a method according to claim 1.

17. A system for illuminating a sample in SPIM microscopy, comprising:
a light source for generating a light beam;
an optical device for forming a light strip from the light beam for substantially planar illumination of a sample in a plane of illumination from at least one direction;
at least one objective having optics designed and intended to deliver detection light emanating from the sample directly or indirectly to a detector, the objective optics interacting with the light strip; and
a light-redirecting device disposed downstream of the objective optics to deflect the light strip such that, after deflection, it propagates at an angle other than zero degrees with respect to the optical axis of the objective or is located in a plane not parallel to the optical axis of the objective,
wherein the object optics is disposed upstream of the sample in an optical path of the light strip so that the objective optics interacts with the light strip upstream of the sample in the optical path of the light strip.

18. The system as recited in claim 17, wherein
the optical device for forming the light strip has at least one beam deflector;

the optical device for forming the light strip has at least one beam deflector in the form of a beam deflector of a scanning microscope or a confocal scanning microscope; or
the optical device for forming the light strip has at least one beam deflector having at least one rotating mirror, a tilting mirror, a rotating prism, a movable lens, or an acousto-optical deflector.

19. The system as recited in claim 17, wherein the optical device for forming the light strip has at least one cylindrical optical element.

20. The system as recited in claim 17, wherein
the shape, the position, or the orientation of the light strip is adjustable; or
the shape, the position, or the orientation of the light strip is adjustable by using the optical device for forming the light strip, by means of the objective, or by using the light-redirecting device.

21. The system as recited in claim 17, wherein
the objective is an immersion objective; or
the objective is an immersion objective and the objective is designed and intended to be immersed together with the light-redirecting device, in a sample chamber or in a sample vessel filled with an optical medium surrounding a sample to be illuminated.

22. The system as recited in claim 17, further comprising an additional objective or condenser optics for delivering the detection light emanating from the sample directly or indirectly to the detector.

23. The system as recited in claim 17, wherein
the light-redirecting device is fixedly securable or fixedly secured, to the objective, to the additional objective, or to the condenser optics; or
the light-redirecting device is retained to the objective, to the additional objective, or to the condenser optics in such a way that it is movable against the force of a resilient member at an angle other than 90 degrees with respect to the optical axis of the objective; or
the light-redirecting device is provided with a connection, such that the light-redirecting device is fixedly securable as a retrofit part to the objective or to another objective.

24. The system as recited in claim 17, wherein at least one component of the light-redirecting device is made integrally with a component of the objective or a component of the additional objective or a component of the condenser optics.

25. The system as recited in claim 17, wherein
the light-redirecting device for deflecting the light strip has a least one at least partially reflective surface;
the light-redirecting device for deflecting the light strip has a least one at least partially reflective surface, said reflective surface being formed as part of a planar mirror; or
the light-redirecting device for deflecting the light strip has a least one at least partially reflective surface, said reflective surface being at least partially formed on the inner side of a cone.

26. The system as recited in claim 17, wherein a sample
is illuminable with the light strip from at least two directions, the light strip being focusable from each of the at least two directions in a single focal region in the sample;
is radially illuminable with the light strip from all directions of a plane, the light strip being focusable from each of the directions of the plane in a single focal region in the sample;

the sample is illuminable from at least two directions by varying the direction of incidence, using the light-redirecting device or the optical device for forming the light strip; or the sample is radially illuminable with the light strip from all directions of a plane by rotating the direction of incidence, using of the light-redirecting device or the optical device for forming the light strip.

27. The system as recited in claim 17, wherein the optical paths of the light beam, of the light strip or of the detection light are matched to one another in such a way that the light strip has a focus at a location in the sample to be observed, and that detection light emanating from the location in the sample has a detection focus on the detector.

28. The system as recited in claim 17, where to compensate for a difference in path length between a light path of the light beam and a light path of the detection light, the light beam is incident on the objective as a divergent light beam;

the light beam passes through additional optics which act only on the light beam, but not on the detection light; or the system has a lengthened detection beam path.

29. The system as recited in claim 17, wherein the light strip is superimposed with at least one stimulation light beam or a stimulation light strip to increase the optical resolution according to the principle of stimulated emission depletion (STED) microscopy and in such a way that the sample region from which the light to be detected in order to generate an image is smaller than the sample region that is illuminated by the light strip; or the light strip is superimposed with at least one stimulation light strip to increase the optical resolution according to the principle of stimulated emission depletion (STED) microscopy, the light strip and the stimulation light strip partially overlapping each other and being oriented parallel to one another.

30. A microscope or an experiment set-up for microscopic imaging of a sample, having a system for illumination according to claim 17.

31. The microscope and/or or an experiment set-up as recited in claim 30, wherein for SPIM microscopy, a device is provided for moving or rotating a sample relative to the objective and to the light-redirecting device;

the sample is placeable in an optical medium;

a sample chamber or a capillary or a sample cup for one or more samples is provided; or at least one pedestal is provided on which a sample is placeable or placed.

* * * * *